US009361676B2

(12) United States Patent
Parker et al.

(10) Patent No.: US 9,361,676 B2
(45) Date of Patent: Jun. 7, 2016

(54) SYSTEM AND METHOD FOR ENHANCING THE LEGIBILITY OF DEGRADED IMAGES

(71) Applicant: GEORGETOWN UNIVERSITY, Washington, DC (US)

(72) Inventors: Jon Parker, Bethesda, MD (US); Gideon Frieder, Potomac, MD (US); Ophir Frieder, Chevy Chase, MD (US)

(73) Assignee: Georgetown University, Washington, DC (US)

( * ) Notice: Subject to any disclaimer, the term of this patent is extended or adjusted under 35 U.S.C. 154(b) by 0 days.

(21) Appl. No.: 14/590,593

(22) Filed: Jan. 6, 2015

(65) Prior Publication Data

US 2015/0125089 A1 May 7, 2015

Related U.S. Application Data

(63) Continuation of application No. 13/301,436, filed on Nov. 21, 2011, now Pat. No. 8,995,782.

(51) Int. Cl.
| G06K 9/40 | (2006.01) |
| G06T 5/00 | (2006.01) |
| G06K 9/34 | (2006.01) |
| H04N 1/409 | (2006.01) |

(52) U.S. Cl.
CPC ............. G06T 5/008 (2013.01); G06K 9/342 (2013.01); G06K 9/40 (2013.01); H04N 1/4092 (2013.01); G06K 2209/01 (2013.01); G06T 2207/10008 (2013.01); G06T 2207/20192 (2013.01); G06T 2207/30176 (2013.01)

(58) Field of Classification Search
None
See application file for complete search history.

(56) References Cited

U.S. PATENT DOCUMENTS

| 5,351,305 A | 9/1994 | Wood et al. |
| 6,798,910 B1 | 9/2004 | Wilson |
| 7,295,702 B2 | 11/2007 | Vrhel |
| 7,528,814 B2 | 5/2009 | Sparre et al. |
| 2002/0176113 A1 | 11/2002 | Edgar |
| 2004/0218829 A1 | 11/2004 | Lee et al. |
| 2011/0176726 A1 | 7/2011 | Lee et al. |

OTHER PUBLICATIONS

Ahmad et al, Local Threshold and Boolean Function Based Edge Detection, IEEE 1999.
Hu et al, Multi-Scale Edge Detection with Bilateral Filtering in Spiral Architecture, Australian Computer Society 2004.
RoboRealm, Adaptive Threshold page extracted from www.roborealm.com/help/Adaptive_Threshold.php, Web Archive date.

*Primary Examiner* — Mark Roz
(74) *Attorney, Agent, or Firm* — Klarquist Sparkman, LLP

(57) ABSTRACT

Disclosed are embodiments for a system, method, and computer program product for performing an process on an original image, the process being implemented by a computer system performs a comprising the at least one computer: performing an process on an image that renders the processed image legible than then the original image, wherein the analysis segregates dark pixels of the image from light pixels of the image. The method can comprise: first converting the image into a grayscale image. The method comprises processing a pixel area for each pixel of the image is a dark pixel or a light pixel and determining if a pixel is proximate to an edge.

31 Claims, 17 Drawing Sheets
(8 of 17 Drawing Sheet(s) Filed in Color)

SYSTEM AND METHOD FOR ENHANCING THE LEGIBILITY OF DEGRADED IMAGES

CROSS REFERENCE TO RELATED APPLICATIONS

The present application is a continuation of co-pending U.S. patent application Ser. No. 13/301,436 entitled SYSTEM AND METHOD FOR ENHANCING THE LEGIBILITY OF DEGRADED IMAGES, filed on Nov. 21, 2011, the entirety of which is incorporated by reference hereby.

BACKGROUND OF THE INVENTION

All document that are not properly preserved suffer degradation over time, and even the most rigorous preservation techniques can only slow degradation of physical documents. Degradation can occur for a variety of reason, such as time, improper storage, poor environmental conditions, damage, and so on. Yet documents vulnerable to such stresses and degradation can contain valuable information, as in the case of found military/terrorism-related documents, historical documents, scanned legal documents, etc. Computerized scanning and imaging of such documents can "freeze" the state of the document at the time of imaging.

SUMMARY OF THE INVENTION

Disclosed are embodiments for a system, method, and computer program product for performing an process on an image, the process being implemented by a computer system comprising at least one data storage device in which is stored image data, at least one computer and at least one computer readable medium storing thereon computer code which when executed by the at least one computer performs a method, the method comprising the at least one computer: performing an analysis on an image that renders the image from a first state to a second state, wherein the second state is more legible than then the first state, wherein the analysis segregates dark pixels of the image from light pixels of the image. The method can comprise: first converting the image into a grayscale image. The method comprises processing a pixel area for each pixel of the image is a dark pixel or a light pixel. The method also comprises establishing a window size parameter for the pixel areas of the image. The method further comprises determining if a pixel is proximate to an edge.

The method comprises identifying a home pixel for the area, the area including a plurality of pixels; determining if the home pixel is darker than a mean pixel within the area; and determining that the home pixel passes a filter criterion if the pixel is darker than the mean pixel within the area, wherein the area is determined by the window size parameter.

The method can comprise manually establishing the window size parameter or automatedly establishing the window size parameter. The automated method can comprises progressively increasing the size of the area around the home pixel and a plurality of neighboring pixels for each of the areas a number of times to establish the window size parameter. The automated method can comprise progressively increasing the size of the area until a lightness or darkness determination for the pixel is substantially the same as between increases.

The method can comprise performing edge detection on the image; and blurring the edge detection output a number of times, wherein the number of times is determined by a blur parameter. The method can further comprise grouping the pixels into a plurality of shade values. The grouping can comprise clustering the blurred edge detection output using a clustering algorithm. The clustering can comprise clustering the blurred edge detection output using a modified K-means clustering algorithm as the clustering algorithm. The grouping can comprise grouping the pixels into the plurality of shade values including a dark cluster, a medium-dark cluster, a medium-light cluster, and a light-cluster.

The method can comprise isolating script pixels based on a filter criteria that filters pixels that are proximate to the edge of the area and (b) are either locally light or locally dark. The method can comprise manually establishing the blur parameter or automatedly establishing the blur parameter. Establishing the blur parameter can comprise computing a first standard deviation of the lightness or darkness determination pixel values in each of a plurality of the progressively increasing window areas; computing a second standard deviation of the derived pixel values from the first standard derivation; and progressively increasing the number of blurs until the differences in the second standard derivation values between blurs plateau.

Also disclosed are image processing means for performing an process on an image, the process being implemented by a computer system comprising at least one data storage device in which is stored image data, at least one computer and at least one computer readable medium storing thereon computer code, comprising: means for performing an analysis on an image that renders the image from a first state to a second state, wherein the second state is more legible than then the first state, wherein the analysis segregates dark pixels of the image from light pixels of the image. The image processing means can comprise: means for first converting the image into a grayscale image. The image processing means comprises means for processing a pixel area for each pixel of the image is a dark pixel or a light pixel. The image processing means also comprises means for establishing a window size parameter for the pixel areas of the image. The image processing means further comprises means for determining if a pixel is proximate to an edge.

The image processing means comprises means for identifying a home pixel for the area, the area including a plurality of pixels; determining if the home pixel is darker than a mean pixel within the area; and determining that the home pixel passes a filter criterion if the pixel is darker than the mean pixel within the area; wherein the area is determined by the window size parameter.

The image processing means can comprise means for manually establishing the window size parameter or automatedly establishing the window size parameter. The automated image processing means can comprises means for progressively increasing the size of the area around the home pixel and a plurality of neighboring pixels for each of the areas a number of times to establish the window size parameter. The automated image processing means can comprise means for progressively increasing the size of the area until a lightness or darkness determination for the pixel is substantially the same as between increases.

The image processing means can comprise means for performing edge detection on the image; and blurring the edge detection output a number of times, wherein the number of times is determined by a blur parameter. The image processing means can further comprise means for grouping the pixels into a plurality of shade values. The grouping means can comprise means for clustering the blurred edge detection output using a clustering algorithm. The clustering means can comprise means for clustering the blurred edge detection output using a modified K-means clustering algorithm as the clustering algorithm. The grouping means can comprise means for grouping the pixels into the plurality of shade values including a dark cluster, a medium-dark cluster, a medium-light cluster, and a light-cluster.

The image processing means can comprise means for isolating script pixels based on a filter criteria that filters pixels that are proximate to the edge of the area and (b) are either locally light or locally dark. The image processing means can comprise means for manually establishing the blur parameter or automatedly establishing the blur parameter. The means for establishing the blur parameter can comprise means for computing a first standard deviation of the lightness or darkness determination pixel values in each of a plurality of the progressively increasing window areas; means for computing a second standard deviation of the derived pixel values from the first standard derivation; and means for progressively increasing the number of blurs until the differences in the second standard derivation values between blurs plateau.

BRIEF DESCRIPTION OF THE DRAWINGS

The patent application or application file contains at least one drawing executed in color. Copies of this patent or patent application publication with color drawing(s) will be provided by the Office upon request and payment of the necessary fee.

FIGS. 9A-9E show examples of original degraded images as compared against the final enhanced images.

DETAILED DESCRIPTION OF EMBODIMENTS

Figure 1A:
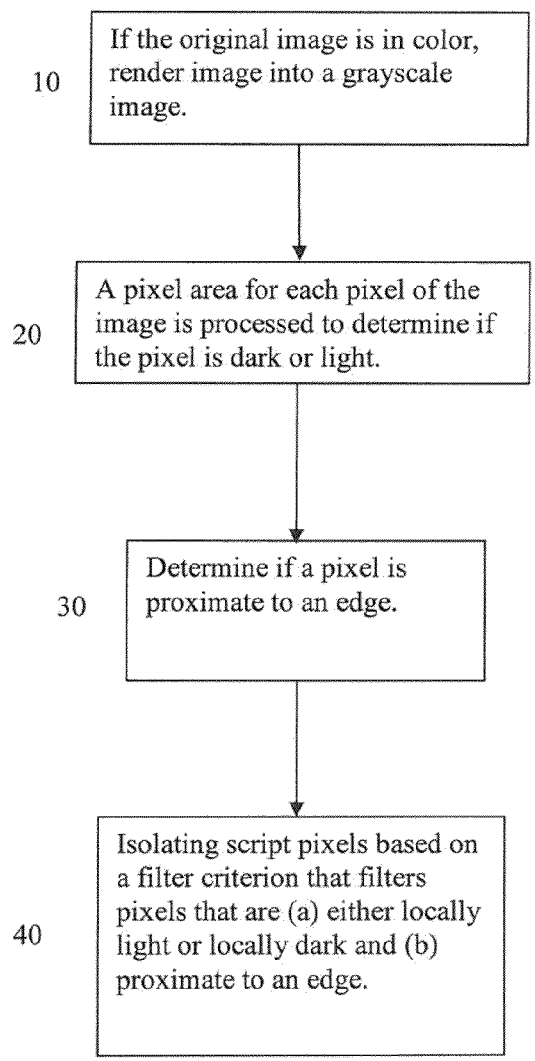
FIGS. 1A-1D are flow charts presenting a method of enhancing the legibility and clarity of image data for documents.

Embodiments of a system and method for enhancing readability of scanned document images are described herein. Embodiments as described herein operate on each document image individually, hence is completely data parallel. Unlike other approaches, in certain embodiments no training data or document model are required. Via principle component analysis, blurring, and edge detection, an automated (namely, user independent) method removes image background noise and improves sharpness of the scripts and characters.

In embodiments disclosed herein, document image enhancement is training set independent document model independent and document language agnostic. Embodiments are applicable to any application that processes scanned documents. These include the processing of found military/terrorism-related documents, historical documents; scanned legal documents, etc. In short, this method can be applied to any corpus of documents that are degraded. In various embodiments, at least one degraded image is provided as input (e.g., due to degradation over time and/or due to improper storage) and at least one black and white image clearly showing the content of the pre-degraded input image, including content intended to be readable or legible is derived as output.

It is to be understood that the figures and descriptions of the present invention are simplified to illustrate elements that are relevant for a clear understanding of the present invention, while eliminating, for purposes of clarity, many other elements which are conventional in this art. Those of ordinary skill in the art will recognize that other elements are desirable for implementing the present invention. Since such elements are well known in the art and do not facilitate a better understanding of the present invention, a discussion of such elements is not provided herein.

The present invention will now be described in detail on the basis of exemplary embodiments.

One embodiment discloses a method comprising: performing an automated (user independent) analysis on an image that renders the image from a first state to a second state, wherein the second state is more legible than the first state, wherein the analysis segregates dark pixels from light pixels. The analysis includes methodology and system configuration that embodies the assumed "truths" that (1) "writing" or "script" will be darker than the local pixels (i.e., background), and (2) "writing" or "script" should generate a detectable edge. Therefore, the logic takes advantage of these truths to find pixels within the scanned images that are both (1) darker than their neighbors and (2) near an edge. As will be understood, these truths can be inverted for "negative" images, such as for example images of lithographs or negatives, in which case script is lighter than local pixels and the script will generate a detectable edge. As used herein, script or writing is to be construed broadly as any kind of symbols, figures, script, icons, drawings, and so on intended to be legible and readable.

FIGS. 1A-1D are flow charts presenting a method of enhancing the legibility and clarity of image data for documents according to an embodiment of the invention. The method is configured to work on an image, as for example a degraded image, that is input into an image database as an image file (e.g., by scanning, digital photograph, etc.). An image as used herein is discussed on an image by image basis, (e.g., page by page), where each image is a "page" of a document in an image database; however, an original image should be broadly understood as a conventional image consistent with that as understood in the art.

Figure 2:
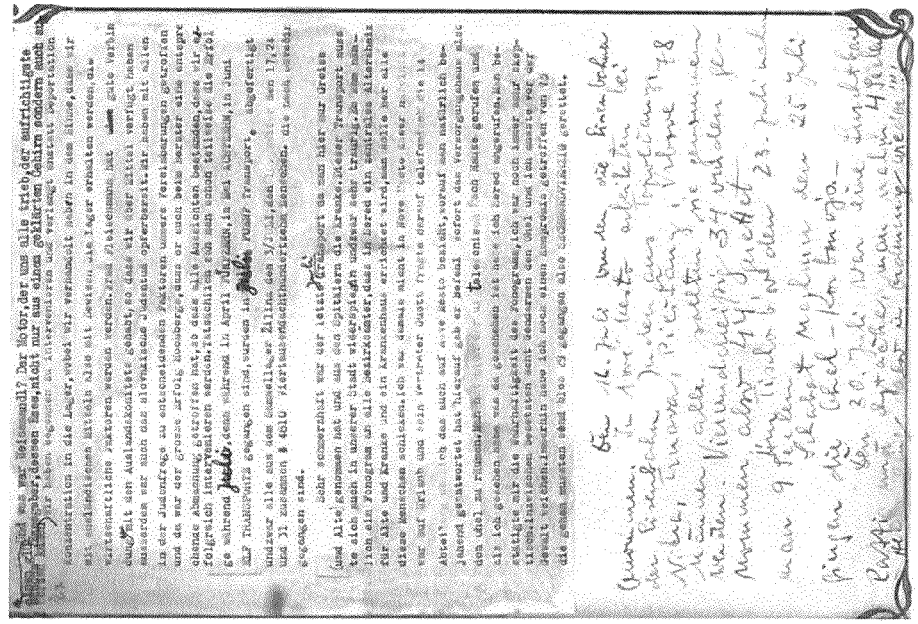
FIG. 2 shows an example of an original color image and a corresponding converted grayscale image.
Figure 2:
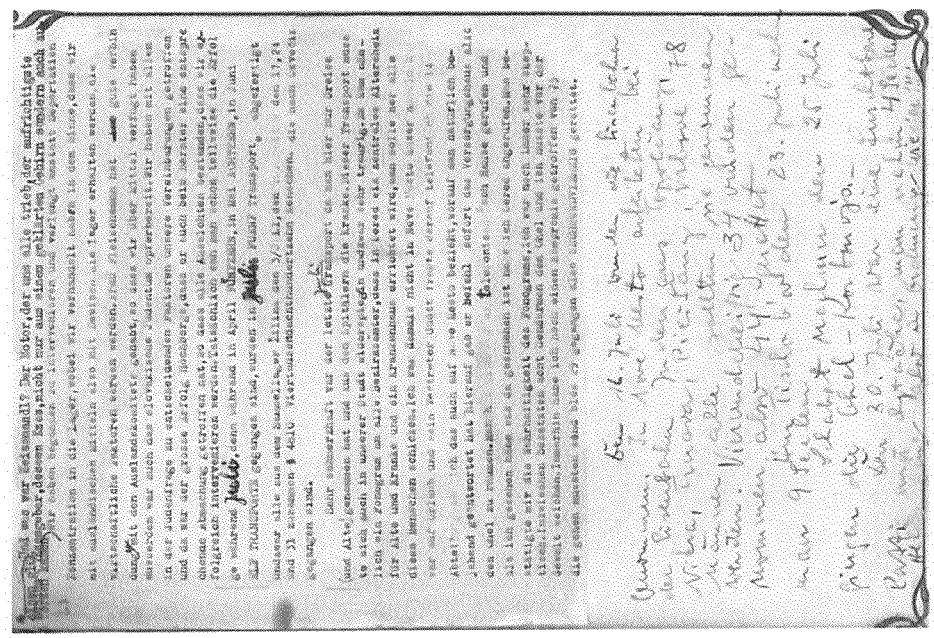

With reference to FIG. 1A, at block 10, if the original image is in color, the image is first prepared by rendering into a grayscale image using methods and techniques known to ordinarily skilled artisans. For example, a conventional technique for converting a color image to a grayscale image is using the standard Linear Algebra technique known as Principle Component Analysis (PCA). Note that other techniques known in the art can be used to produce viable grayscale images. This step need not be implemented if the original image is in grayscale. An original image has Width w and Height h, resulting in a total pixels (n=w*h) for the image. For a color image, each pixel is a 3-dimensional (3-d) vector: $Pixel_i=(red_i, green_i, blue_i)$. The system is configured to flatten or compress the n 3-d vectors into n 1-d vectors, that is, into n numerical values. The result is a numbers, one for each pixel. If PCA is used to generate the corresponding grayscale image, namely to compute a numbers, PCA is performed on the n 3-d vectors of the image retaining only the first component (i.e., retaining only the most significant dimension). The resulting numbers are normalized to range from 0 to 1. These normalized numbers are then scaled from "black" to "white," resulting in a grayscale image of the original color image. An example of an original color image 200 being converted to a grayscale image 202 by PCA is shown at FIG. 2. As noted before, other transformations known in the art can be used.

Figure 1B:
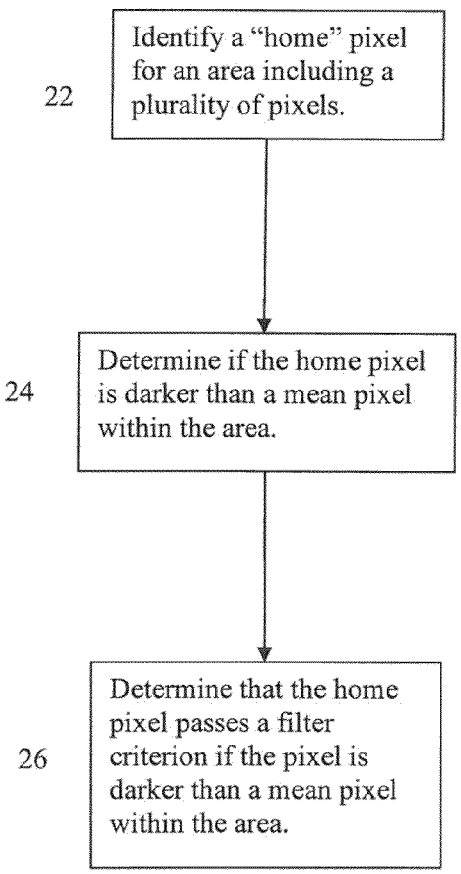
Figure 3:
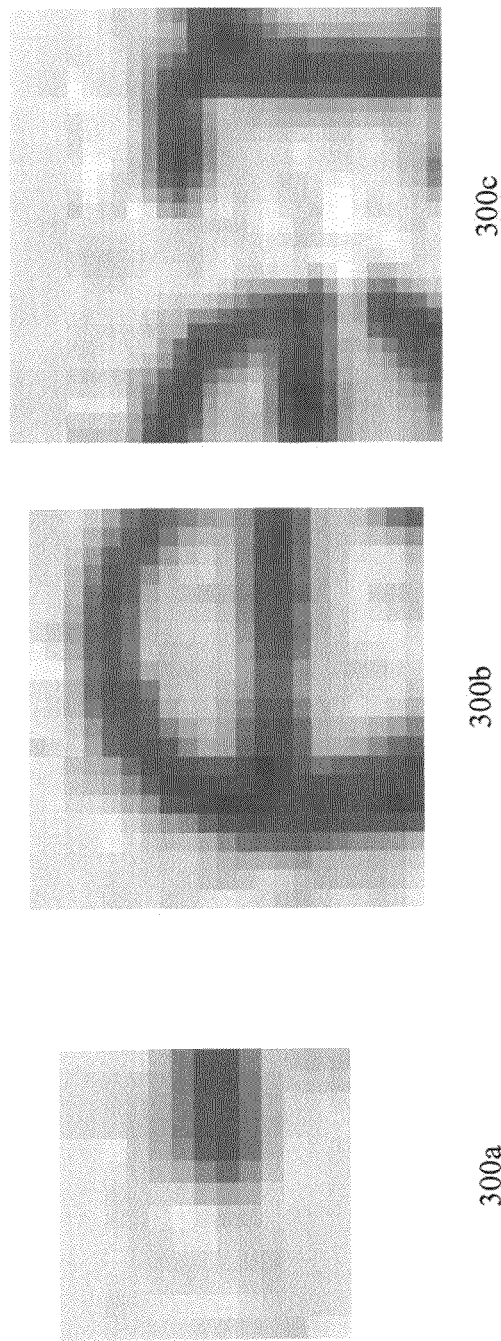
FIG. 3 shows exemplary pixel windows for an image.

Referring to FIG. 1A, at block 20 a pixel area for each pixel of the image is processed to determine if the pixel is dark or light, an embodiment of which is described at FIG. 1B. The system is configured to find "dark" pixels, where "dark" is defined locally as described herein. Turning to FIG. 1B, taking the grayscale image, at block 22, each pixel is identified as a "home" pixel for an area including a plurality of pixels. At block 24, it is determined if the home pixel is darker than a mean pixel within the area. At block 26 the system is configured to determine that the home pixel passes a filter criterion if the pixel is darker than a mean pixel within the area. In one embodiment, a window of neighboring pixels is a square of pixels centered around a home pixel such as a "center" pixel. If the center pixel is "dark" it might be text, whereas if the center pixel is "light" it is unlikely to be text. A pixel is considered dark if the pixel is darker than the average pixel within its pixel area (i.e., "window of neighboring pixels"). Exemplary pixel windows, 300a, 300b, 300c are shown at FIG. 3. As will be noted, the pixel windows are of differing sizes. The pixel area including the plurality of pixels is determined by a window size parameter, described herein.

Figure 4:
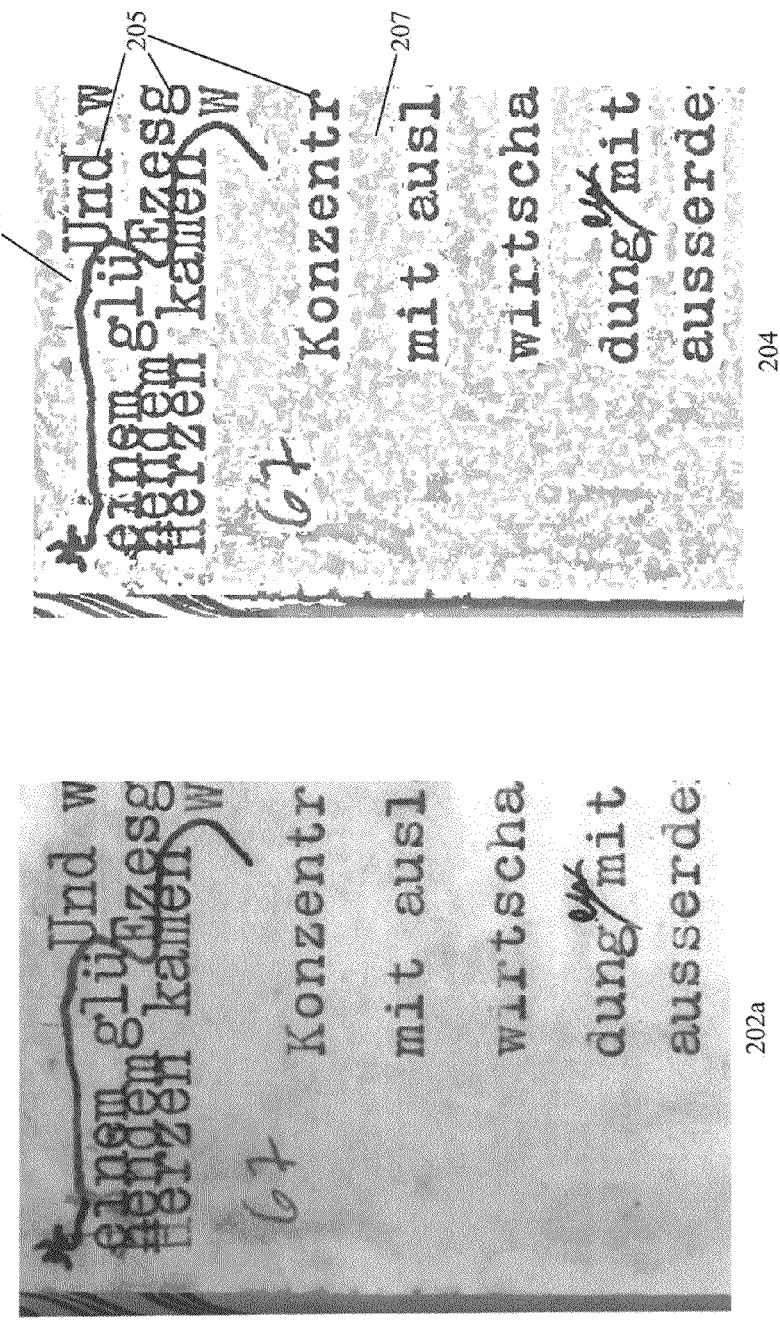
FIG. 4 shows a magnified view of a portion of the image input of grayscale image and the image output after a determination of locally light and locally dark pixels.
Figure 8:
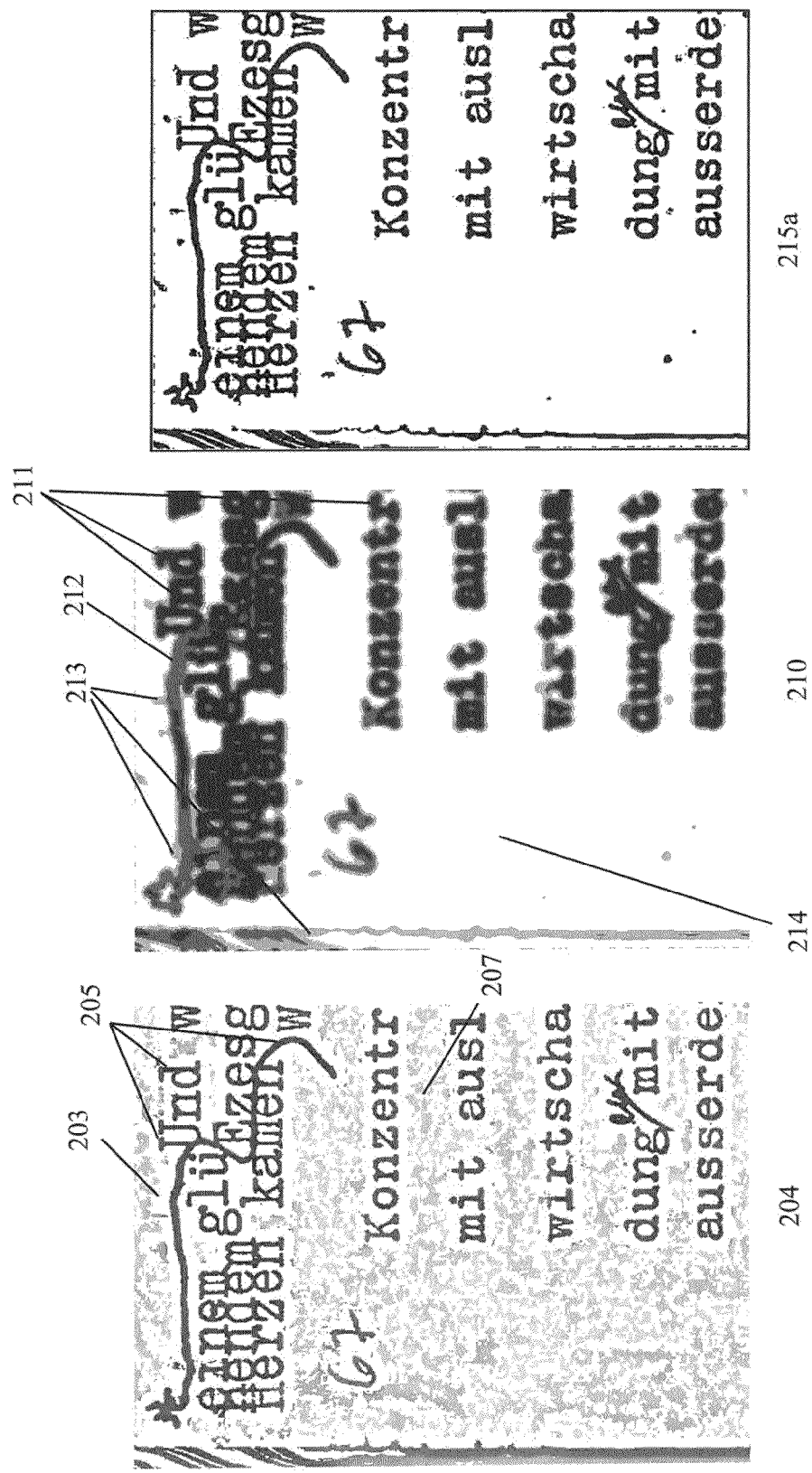
FIG. 8 shows a segmented image, a clustered image, and the output image which is the combination of those two images.

FIG. 4 shows a magnified view of a portion of the input grayscale image 202a, and the image output 204 after the determination of light and dark pixels is run at blocks 22-26. The resulting segregated image sets "light" pixels to white 203 (also as shown in FIG. 8) whereas "dark" pixels 205 and 207 maintain some shading for illustrative purposes. Consequently, in the output image 204, areas representing script, which are substantially identified as darkest, are surrounded by a white outline while in non-text areas, the result is light speckling and shading 207 (also as shown in FIG. 8).

Figure 1C:
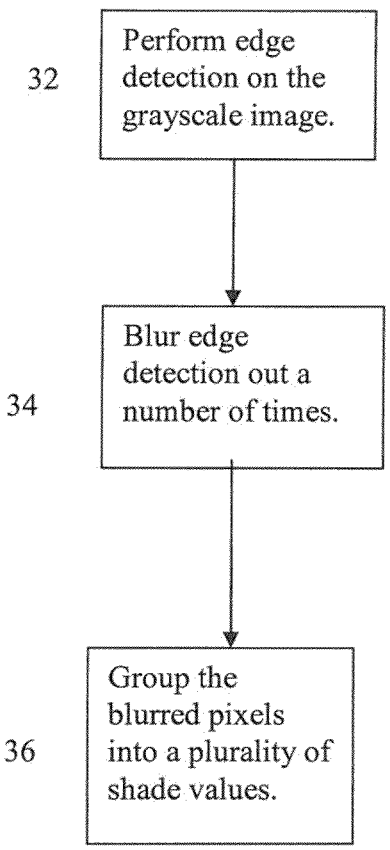
Figure 5:
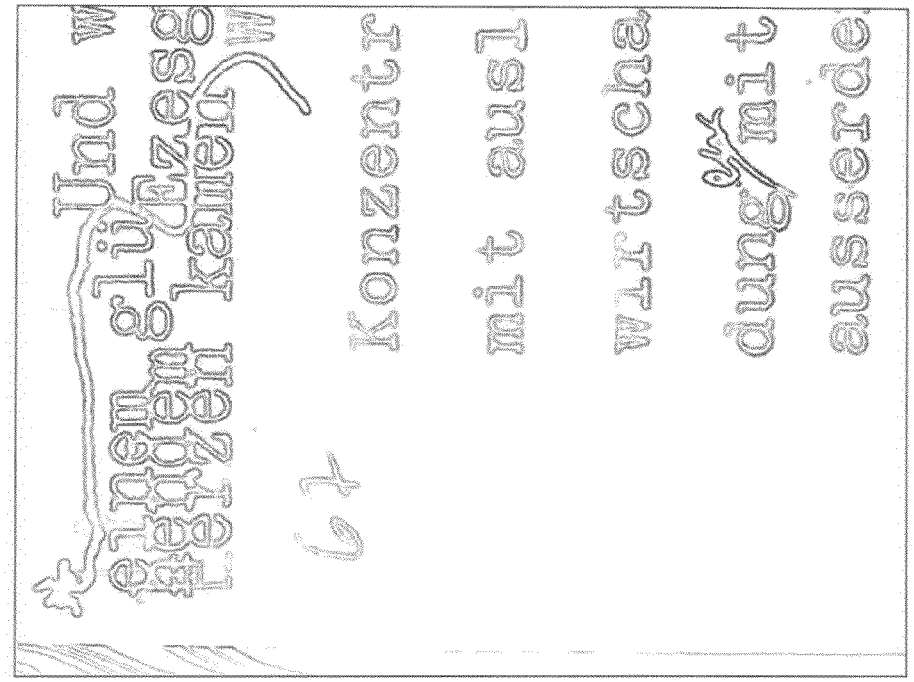
FIG. 5 shows a magnified view of a portion of the image input of grayscale image and the image output after edge detection
Figure 5:
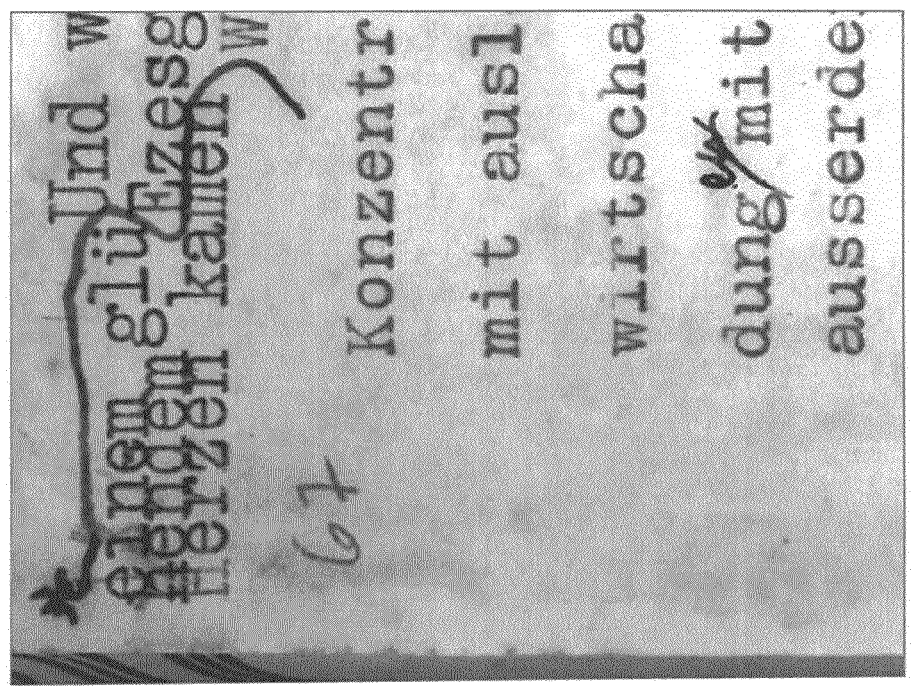

At block 30 of FIG. 1A, the method comprises determining if a pixel is proximate to an edge, an embodiment of which is shown at FIG. 1C. As shown at block 32 of FIG. 1C, the determination comprises performing edge detection on the grayscale image 202. Edge detection can be carried out using edge detection techniques known to ordinarily skilled artisans. As will be appreciated, image edge detection is a well-documented image processing topic, and includes techniques such as Canny Edge Detection and Sobel Operators. Edge detection works by computing or estimating a local color gradient for pixel areas. If the gradient is steep, edge detection proceeds on the basis that as colors or shades are changing quickly, there is an "edge." FIG. 5 shows a magnified view of a portion of the image input of grayscale image 202a, and the image output 206 after the determination edge detection is run at block 32. The resulting image lightens the areas where the shades are not changing quickly; it retains "edge" areas where shades are changing quickly. Consequently, in the output image 206, the pixels for script take an outlined appearance and the rest of the image having a "washed out" appearance. The result is that dark pixels typically form the boundary between text and non-text.

Figure 6:
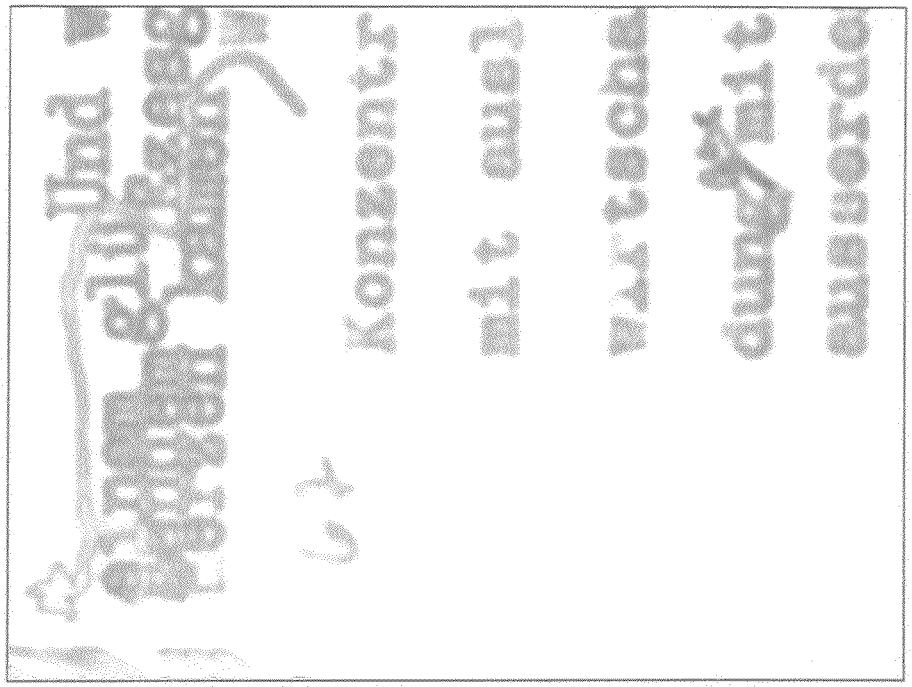
FIG. 6 shows a magnified view of a portion of an image after edge detection provided as input and the image output after blurring.
Figure 6:
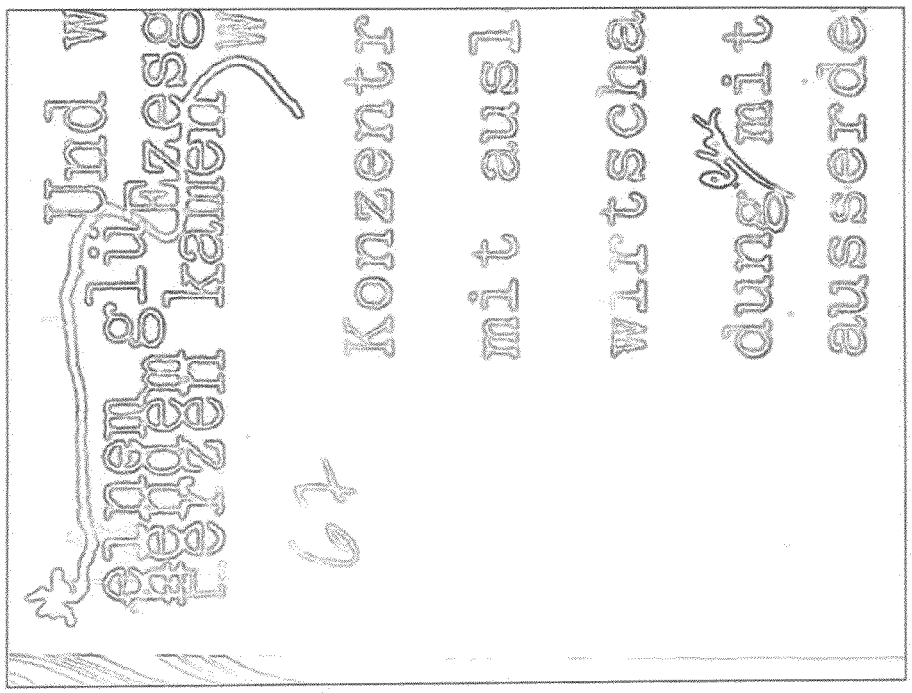

At block 34, the edge detection output 206 is blurred a number of times (j). FIG. 6 shows a magnified view of a portion of the image input of grayscale image 206, and the image output 208a . . . 208j after blurring is run at block 34. As described above, in the edge detection image dark pixels typically form the boundary between text and non-text. Blurring the edge detection image 206 smudges those dark edge pixels, as shown in output blurred image 208a . . . j. A smudging distance is achieved by blurring and reblurring the image a number of times. The number of times the image should be blurred, j, is determined by a blur parameter as described herein.

At block 36, the blurred pixels are grouped into a plurality of shade values. In one embodiment, grouping the blurred pixel output is performed by clustering the blurred edge detection output using a clustering algorithm. An exemplary clustering algorithm includes a modified K-means clustering algorithm as the clustering algorithm. For example, one modification is "Intelligent" K-means clustering. K-means clustering is a known clustering algorithm in the art. (See, for example: MacQueen, J. B. (1967). "Some Methods for classification and Analysis of Multivariate Observations". Proceedings of 5th Berkeley Symposium on Mathematical Statistics and Probability. University of California Press. pp. 281-297. MR0214227. Zbl 0214.462011. Hamerly, G. and Elkan, C. (2002). "Alternatives to the k-means algorithm that find better clusterings". *Proceedings of the eleventh international conference on Information and knowledge management (CIKM)*; and MacKay, David (2003). "Chapter 20. An Example Inference Task: Clustering". *Information Theory, Inference and learning Algorithms*. Cambridge University Press. pp. 284-292, the entirety of each of which are incorporated by reference herein.) Conventional K-means seeds each cluster of input pixel data from an image with a random data point. "Intelligent" K-means clustering, however, modifies K-means clustering by grouping the input data from blurred image 208a . . . j (by grayscale value) and creates "initial clusters" that contain a plurality of values, for instance a 1st, 2nd, 3rd, and 4th quarter of the input pixel data. Conventional K-means clustering does no such grouping. Thus, the method builds a plurality (e.g., 4) of clusters of pixel data. However, other numbers of clusters can be used. As shown herein the pixels are then grouped into the plurality of shade values including a dark cluster, a medium-dark duster, a medium-light duster, and a light-duster.

Figure 7:
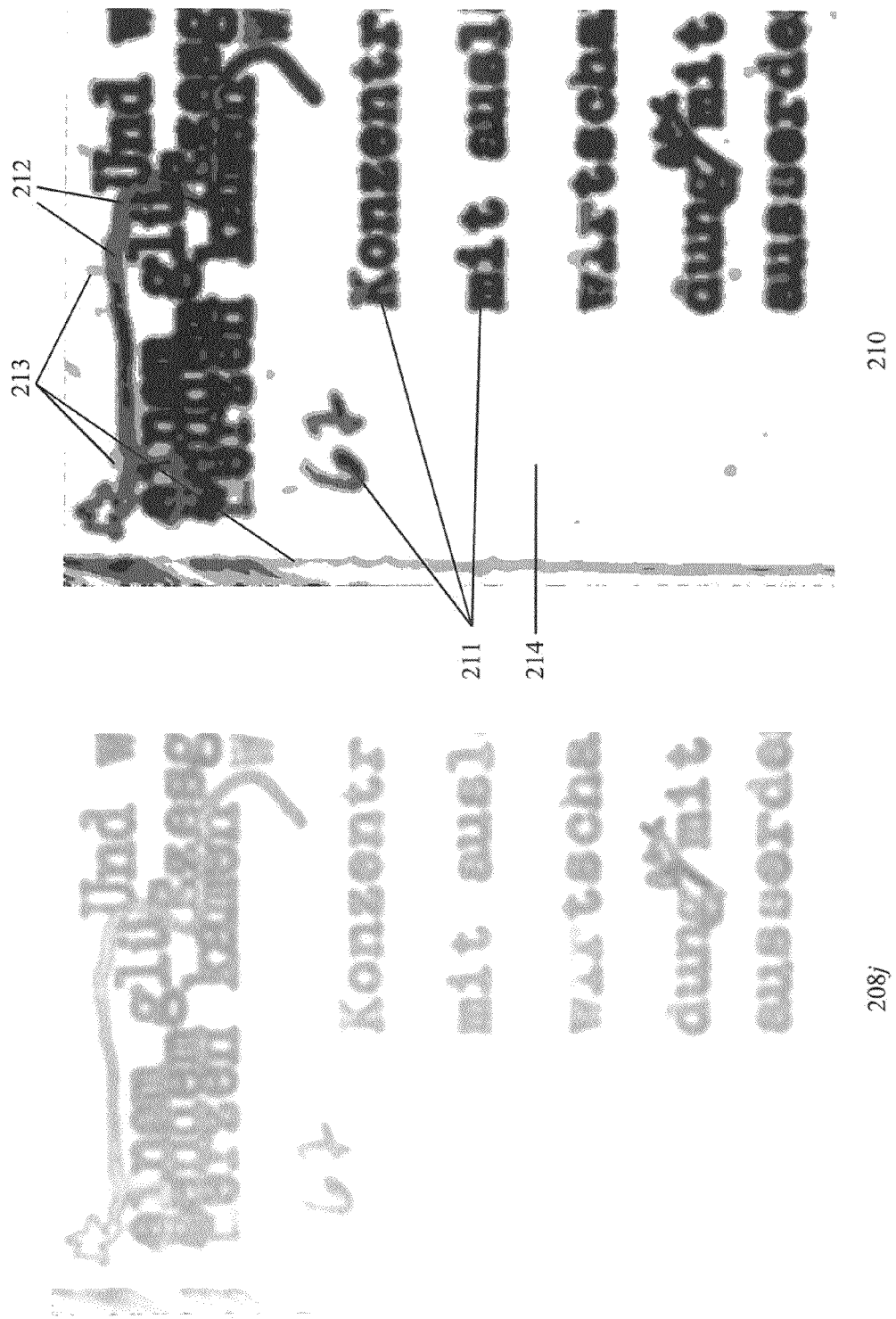
FIG. 7 shows a magnified view of a portion of the image input of a blurred image and the grouped clustered output after the modified clustering is run.

FIG. 7 shows a magnified view of a portion of the image input of blurred image 208j, and the grouped clustered output 210 after the modified clustering method is run at 36. The resulting grouped image 210 darkens the blurred script areas from 208j in mostly dark dusters 211, whereas the edges of the script are largely grouped into values of medium-dark 212, and outside the medium-dark are areas of medium light 213 and the remainder of the image is mostly light (white) 214.

Figure 9A:
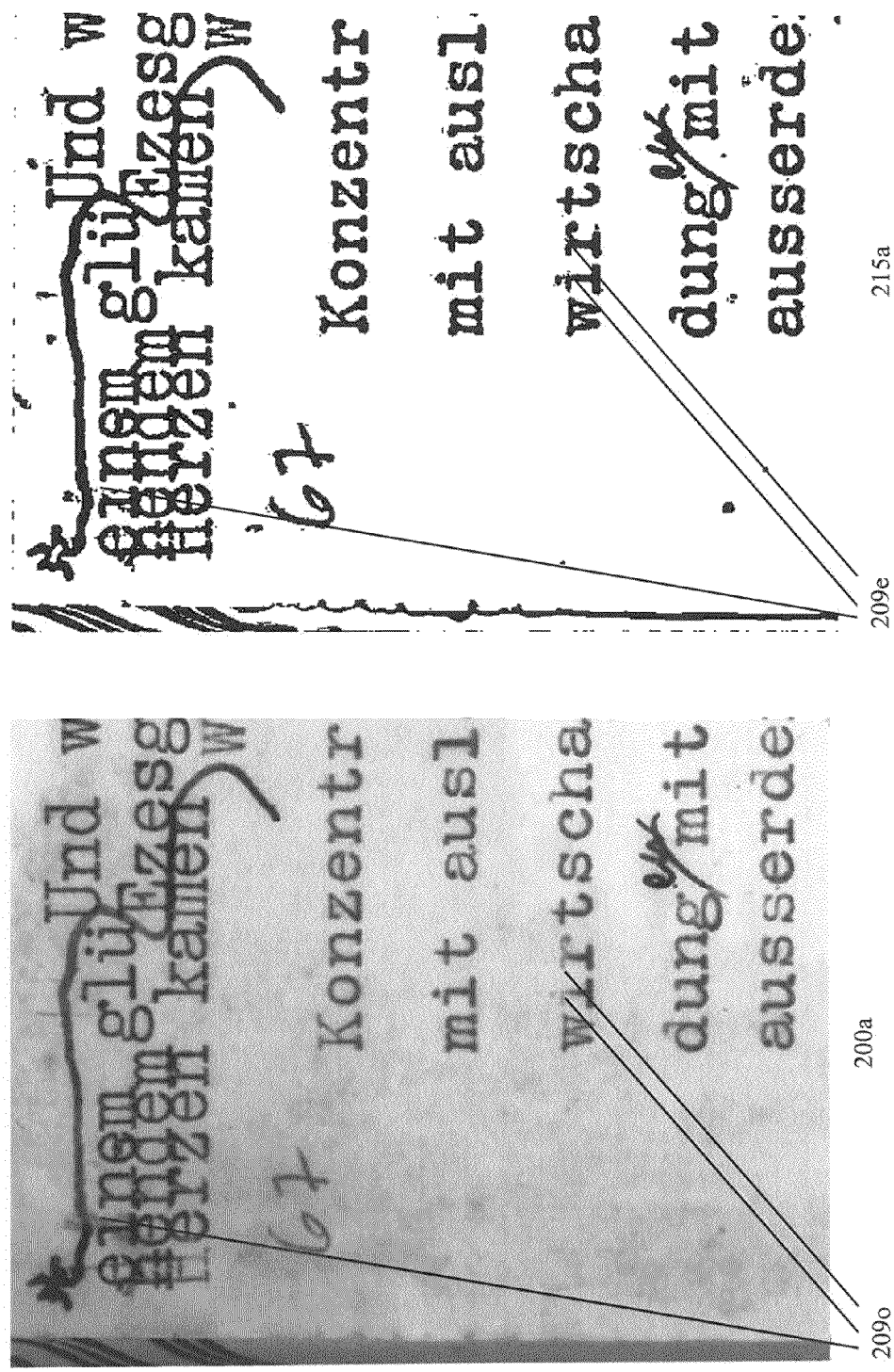

Returning to FIG. 1A, at block 40 the method comprises isolating script pixels based on a filter criterion that filters pixels that are (a) proximate to an edge and (b) are either locally light or locally dark. In the embodiments described herein, locally dark pixels are isolated, however, as will be appreciated, the methods and systems can be readily configured to isolate and filter locally light pixels (e.g., for a negative). As shown at FIG. 8, in one embodiment, this is achieved by combining the segregated image 204 as described herein with respect to block 20 FIG. 1A and FIG. 1B with the pixels segregated into light pixels and dark pixels as an input with the clustered image 210 from block 30 and FIGS. 1C and 1D. FIG. 8 shows a magnified view of portions of the image inputs of the segregated image 204 and the clustered image 210. The resulting enhanced image 215a cross-references the locally dark pixels from the segregated image and the script that is proximate to an edge from clustered image 210. Only pixels that meet both criteria are shown in black in the enhanced image 215a, and the rest of the image is white, resulting in a crisp, highly legible image. As shown at FIG. 9A, the original image 200a is compared against the final enhanced image 215a. As will be noted, degraded script 209o that was faded or obscured in the original image 200a is clearly legible enhanced script 209e, and the enhanced script 209e is even and consistent with the script (black) of the whole image in the enhanced image 215a.

Figure 9B:
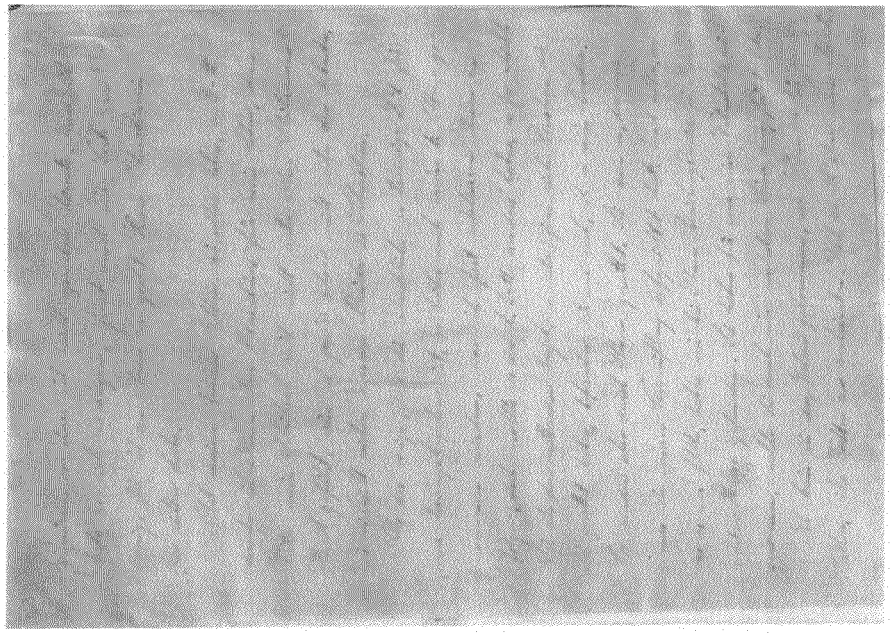
Figure 9C:
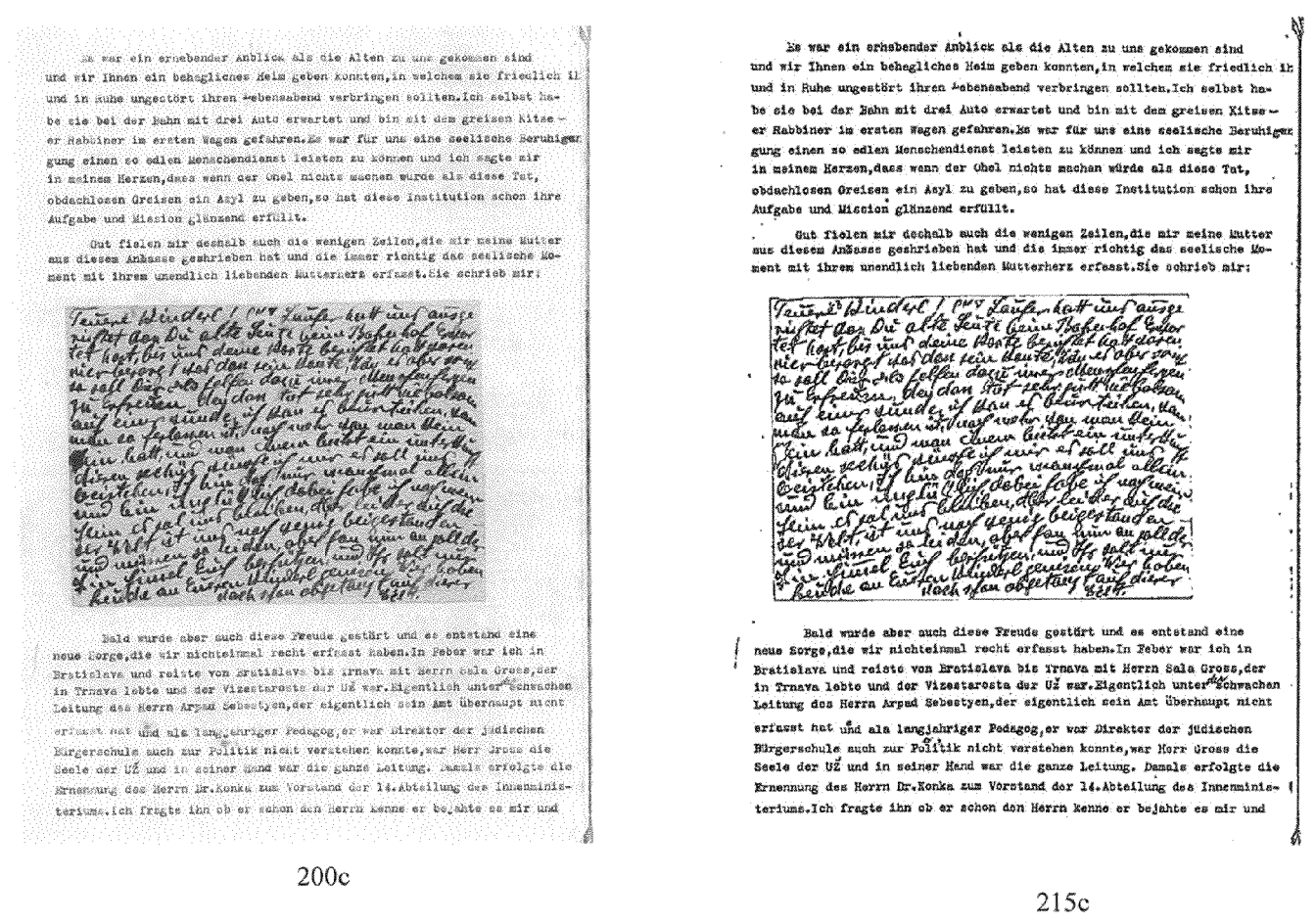
Figure 9D:
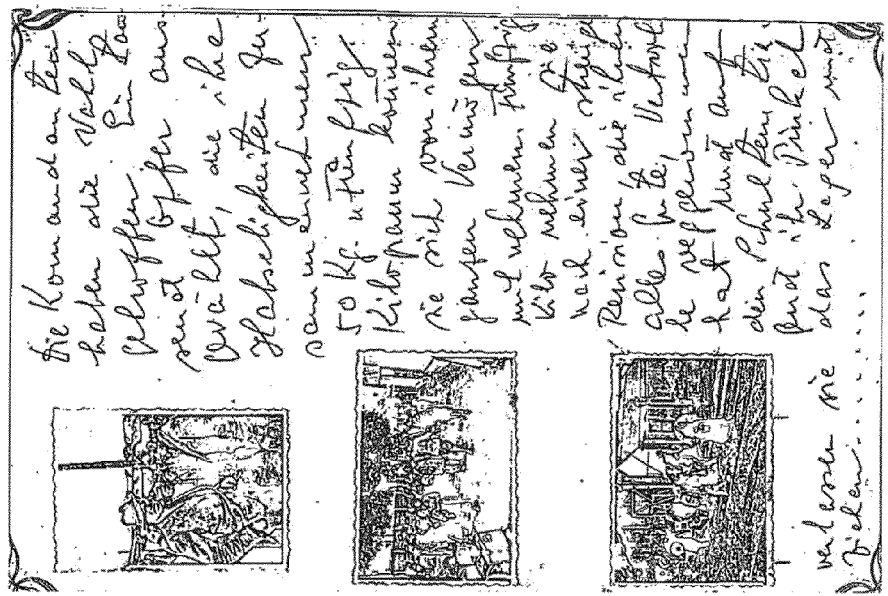
Figure 9D:
Figure 9E:
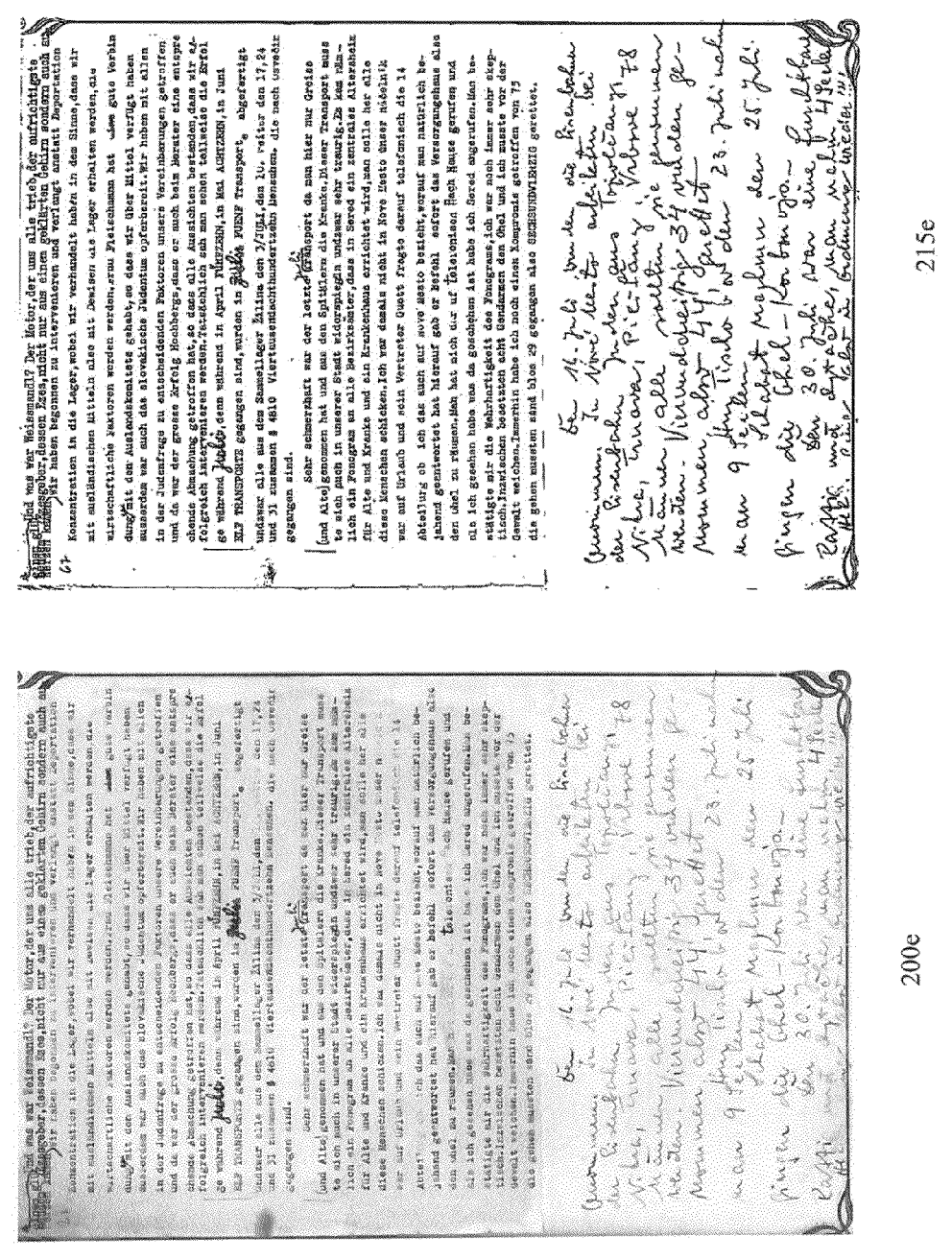

FIGS. 9B-9E show further examples of original images 200b-200e and enhanced images 215b-e, which show that a wide variety of script and symbols can be enhanced and made more legible, readable, and clear. For instance, FIG. 9B shows an original historical document with highly degraded script 209o which is handwritten. The output enhanced image 215b shows a highly readable and legible document image. FIGS. 9C and 9E show original images 200c, 200e and enhanced images 215c, 215e having both handwriting and typeset in the same image, and in FIG. 9E, the typeset has handwritten edits. As shown in FIG. 9D, the original image 200d and enhanced image 215d includes photos; the presence of the photos does nothing to impede the script enhancement, although the photo is treated by it. Thus in one embodiment the system could be configured to identify photos either before or after the script enhancement method for the purpose of reincorporating the original image or grayscale image back into the enhanced image (not shown).

As noted above, two parameters need to be set for the automated analysis on an image, blurring parameter and a window size parameter. While these parameters can be manually set, as shown herein, these parameters can also be set automatedly and without any human intervention.

First is described a window size parameter. As noted above, a pixel is "locally dark" if it is darker than the average pixel within its pixel area. Exemplary pixel windows, 300a, 300b, 300c are shown at FIG. 3. As shown in FIG. 3, the pixel windows are of differing sizes 300a, 300b, 300c. The pixel area including the plurality of pixels is determined by a window size parameter. In considering efficient use of computer processing power and speed, larger areas or windows consume more resources, and in some cases, also fail to detect faint text in the presence of dark text. On the other hand, small windows allow noise to pass, and can result in (for example) misidentifying pixels as text. In an embodiment, the method includes establishing a window size parameter for the pixel areas of the image. One embodiment of a window size parameter is described as "WINDOW_SIZE" herein. As shown herein, the window size parameter can be automatedly configured. Note that in another embodiment, the manual setting of the WINDOW_SIZE can be supported.

In one embodiment, the window size parameter can be automatedly configured. The method comprises progressively increasing the size of each pixel's pixel area a number of times to establish the window size parameter. In one embodiment a window of neighboring pixels is a square of pixels centered around a home pixel such as a "center" pixel and a plurality of neighbor pixels. In Table 1, as the window size increases, the number of pixels in the window increases quadratically. Thus the first window size of 9 generates a pixel area containing 81 pixels. This pixel area contains the home pixel h and 80 neighboring pixels. In the next column, the window size increases by 4, (2 pixels in each direction y, −y, x, and −x) bringing the window size to 13 and the number of pixels within the pixel area to 169. The embodiment continues to progressively expand the window size by the same magnitude (2 pixels in each direction). Thus, the window size take on the values of 9, 13, 17, 21, 25, 29, 33 . . . as the window expands. Note that the window size can be increased by other than 2 pixels in each direction at each iteration.

The method includes progressively increasing the size of pixel areas until the white/black determination for most pixels remains the same between increases. In one embodiment, a determination is made that the white/black determination for most pixels are substantially the same between increases when the number of pixels that change color from black to white or white to black is less than 0.5%. Other threshold percentage values can be set. Table 1 shows an example of one embodiment, where the window size parameter WINDOW_SIZE is increased until the "next" image is nearly indistinguishable from the "previous" image. All results presented in Table 1 assume NUM_BLURS is set to 4.

TABLE 1

Measuring Change in an output image while increasing Window Size (NUM_BLURS = 4)

| | Change in Window Size | | | | | |
|---|---|---|---|---|---|---|
| | 9 to 13 | 13 to 17 | 17 to 21 | 21 to 25 | 25 to 29 | 29 to 31 |
| Number of Changed Pixels | 137192 | 71102 | 53599 | 42833 | 39606 | 36172 |
| Percentage of Changed Pixels | 1.42% | 0.74% | 0.55% | 0.44% | 0.41% | 0.37% |

In the example shown in Table 1, the starting grayscale image, as well as the output image, had 9,667,636 pixels. As the window size increases, fewer pixels change from white to black or black to white in the final image. When the WINDOW_SIZE parameter was increased from 9 pixels to 13 pixels 137,192 pixels in the respective resulting images changed color (black to white or white to black). Thus 1.42% of the pixels changed their shade value. However, when the WINDOW_SIZE parameter was increased from 21 pixels to 25 pixels 0.44% of the pixels in the resulting images changed shades, falling beneath the 0.5% threshold. Thus, based on the method above, the system parameter can be obtained by determining when increasing the size of pixel areas fails to change the resulting image by 0.5 percent or more. Note, again, 0.5% is an exemplary change percentage. Other threshold values are possible. The threshold value chosen affects the output image clarity and the total processing time. As shown herein, for the exemplary data set used, 0.5% yielded readable output images.

Figure 1D:
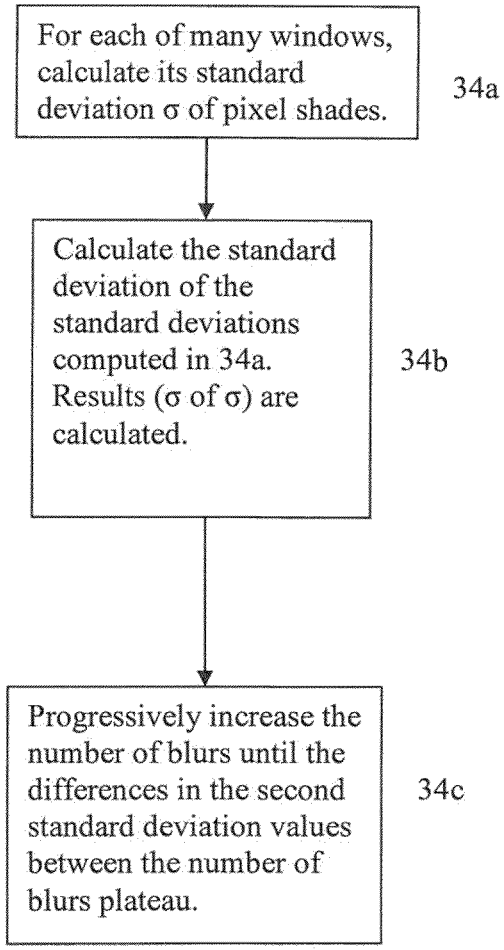

The method also incorporates a blur parameter. As explained above with respect to FIG. 1C, the edge detection output 206 is blurred a number of times. The number of times the image should be blurred is determined by a blur parameter as described herein. One embodiment of a blur parameter is described as a "NUM_BLURS" parameter, the establishment of which is shown at FIG. 1D. As shown herein, the blur parameter can be automatedly configured. Note that in another embodiment, the manual setting of the NUM_BLURS can be supported.

Figure 10:
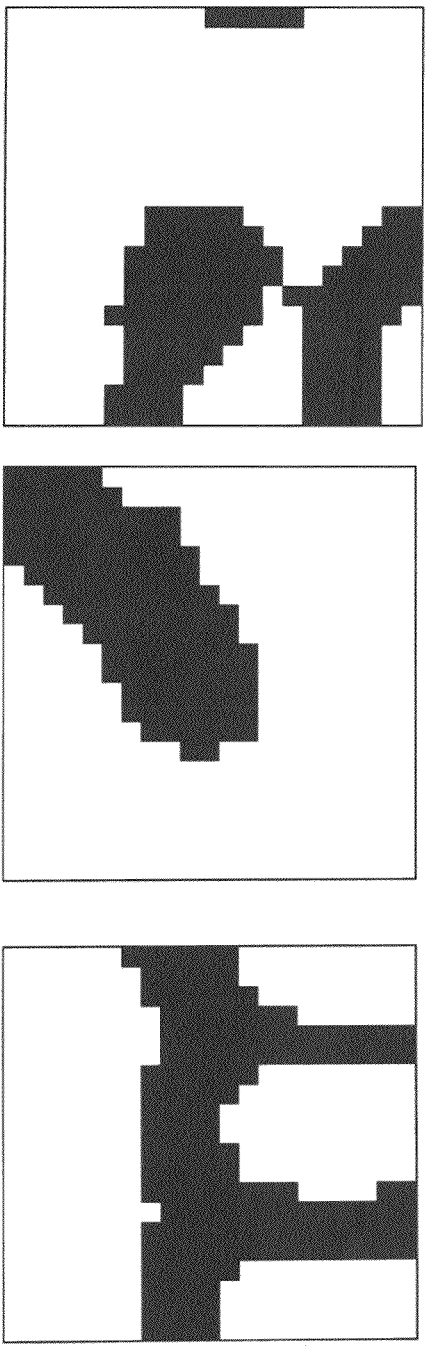
FIG. 10 shows multiple example windows extracted from the final black and white image to be used to compute the "standard deviation of standard deviations" statistic.

In one embodiment, the blur parameter can be automatedly configured. The method for establishing the blur parameter comprises repeatedly executing the full algorithm (as shown in blocks 20 through 40), incrementing the blur parameter for each execution. The process of repeatedly executing the full algorithm ends when a statistic (the "standard deviation of standard deviations" statistic introduced later) computed from each execution's black and white output image plateaus. To compute the required statistic, a plurality or subset of window areas are extracted from the output black and white image 215. Each of these window areas contains some number of white pixels and some number of black pixels as shown in FIG. 10. The standard deviation of this white/black mix is computed for every window area. Next, the standard deviation of the plurality of standard deviations is computed. This "standard deviation of standard deviations" is the statistic used to determine when the repeated execution of the full algorithm should stop. The repeated execution of the full algorithm stops when the "standard deviation of standard deviations" statistic plateaus. That is, the percentage change in the "standard deviations of standard deviations" is less than some threshold. The value for the blurs parameter is found by selecting the value of the blurs parameter used in the final iteration of the algorithm (i.e., the execution in which the statistic was determined to have plateaued).

TABLE 2

Measuring Change in the "σ of σs" Statistic
While Increasing the Number of Blurs
(WINDOW_SIZE = 25)

| Change in Num Blurs | 2 to 4 | 4 to 6 | 6 to 8 | 8 to 10 |
|---|---|---|---|---|
| Change in "σ of σs" statistic | 2.95 | 0.27 | 0.04 | 0.03 |

Table 2 shows a table of the change in the second standard deviations results (σ of σs) caused by increasing the NUM_BLUR parameter a fixed amount.

As shown at Table 2, once the second standard deviations results (σ of σs) are determined, a plateau is identified as the number of blurs at which the differences between the second standard deviations for a given number of blurs (that is, between columns in the table) do not change significantly as compared to the differences of the second standard deviations between prior blurs.

For example, as seen in Table 2, between 4 to 6 blurs, at window size 25 there is a substantially smaller difference of 0.27 as compared to the difference between 2 and 4 blurs (2.95). As will be noted, the differences remain small as the blurs increase, thus, further showing that a plateau has been reached. Thus, after 6 blurs there will not be much change. Accordingly, in an embodiment, the rule for setting the blur parameter NUM_BLURS is to increase the number of blurs until the change in the standard deviation of the standard deviations (σ of σs) plateaus. Thus both WINDOW_SIZE and NUM_BLURS are established without user intervention. Note, however, that similar to WINDOW_SIZE, the number of blurs can be manually set.

Figure 11:
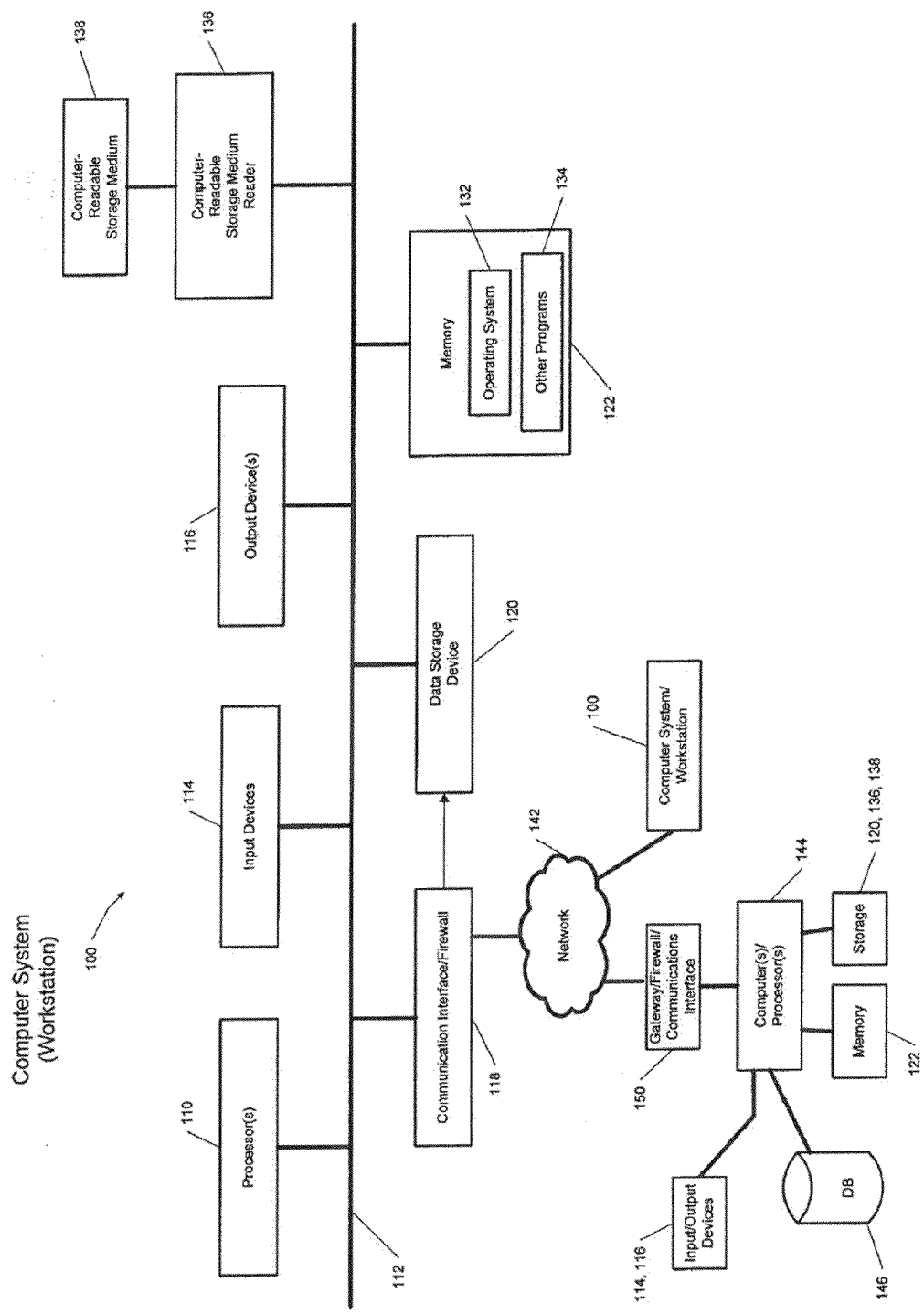
FIG. 11 illustrates an exemplary computer system and architecture for carrying out the method for image enhancement.

Embodiments of the invention may be implemented by systems using one or more programmable digital computers and computer readable storage media. In one embodiment, FIG. 11 depicts an example of one such computer system 100, which includes at least one processor 110, such as, e.g., an Intel or Advanced Micro Devices microprocessor, coupled to a communications channel or bus 112. The computer system 100 further includes at least one input device 114 such as, e.g., a keyboard, mouse, touch pad or screen, or other selection or pointing device, at least one output device 116 such as, e.g., an electronic display device, at least one communications interface 118, at least one computer readable medium or data storage device 120 such as a magnetic disk or an optical disk and memory 122 such as Random-Access Memory (RAM), each coupled to the communications channel 112. The communications interface 118 may be coupled to a network 142.

One skilled in the art will recognize that many variations of the system 100 are possible, e.g., the system 100 may include multiple channels or buses 112, various arrangements of storage devices 120 and memory 122, as different units or combined units, one or more computer-readable storage medium (CRSM) readers 136, such as, e.g., a magnetic disk drive, magneto-optical drive, optical disk drive, or flash drive, multiple components of a given type, e.g., processors 110, input devices 114, communications interfaces 118, etc.

In one or more embodiments, computer system 100 communicates over the network 142 with at least one computer 144, which may comprise one or more host computers and/or server computers and/or one or more other computers, e.g. computer system 100, performing host and/or server functions including web server and/or application server functions. In one or more embodiments, a database 146 is accessed by the at least one computer 144. The at least one computer 144 may include components as described for computer system 100, and other components as is well known in the computer arts. Network 142 may comprise one or more LANS, WANS, intranets, the Internet, and other networks known in the art. In one or more embodiments, computer system 100 is configured as a workstation that communicates with the at least one computer 144 over the network 142. In one or more embodiments, computer system 100 is configured as a client in a client-server system in which the at least one other computer comprises one or more servers. Additional computer systems 100, any of which may be configured as a work station and/or client computer, may communicate with the at least one computer 144 and/or another computer system 100 over the network 142.

For example, one or more databases 146 may store the scanned image data as described herein. In various embodiments, the processing disclosed herein may be performed by computer(s)/processor(s) 144 in a host arrangement with computer system 100, or in a distributed arrangement in computer system 100 and computer(s)/processor(s) 144, or by computer system 100 in cooperation with data stored in database 146. Computer(s)/Processor(s) 144 may perform the processing disclosed herein based on computer code stored in a storage device or device(s) 120, 136, 138 and/or memory 122.

Figure 12:
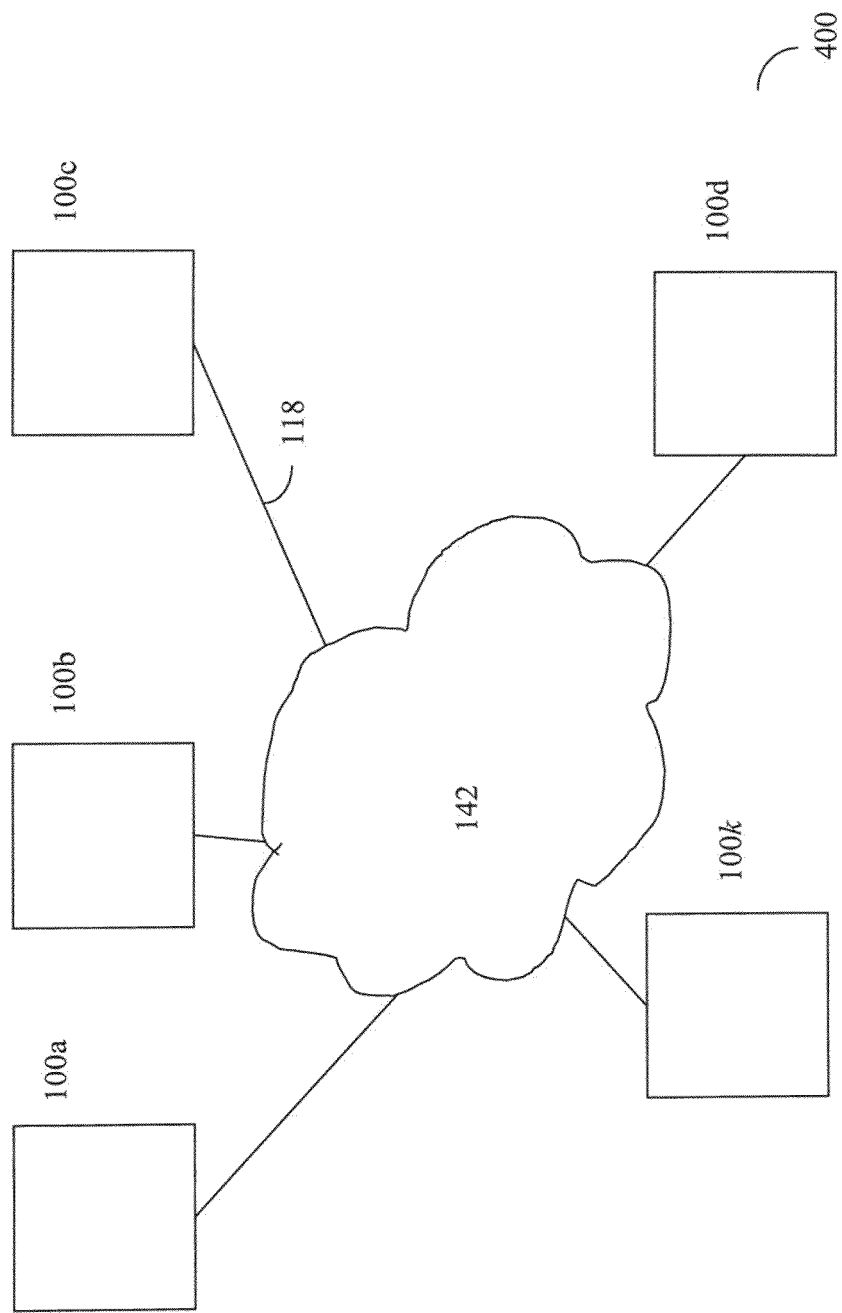
FIG. 12 shows an exemplary network environment for carrying out the method for image enhancement.

FIG. 12 shows an exemplary network environment 400 adapted to support embodiments as disclosed herein, as for example for data parallel processing of images. The exemplary environment 400 includes a network 142, and a plurality of computers 100, or computer systems 100 (*a*) . . . (*k*) (where "k" is any suitable number). Computers could include, for example one or more SQL servers. Computers 100 can also include wired and wireless systems as described herein. Data storage, processing, data transfer, and program operation can occur by the inter-operation of the components of network environment 400. For example, a component including a program in server 100(*a*) can be adapted and arranged to respond to data stored in server 100(*b*) and data input from server 100(*c*). This response may occur as a result of preprogrammed instructions and can occur without intervention of an operator. As described herein, in certain embodiments the automated method is configured to process images individually on an image-by-image basis, where each image is a "page" of a document in an image database. Accordingly, the system can be configured for data parallel processing of images and pages. Pages or images from a given document or set of documents can be partitioned and distributed among the computer systems 100 (*a*) . . . (*k*) for parallel processing and the document or document set recombined after processing. Again, this response may occur as a result of preprogrammed instructions and can occur without intervention of an operator.

The network 142 is, for example, any combination of linked computers, or processing devices, adapted to access, transfer and/or process data. The network 142 may be private Internet Protocol (IP) networks, as well as public IP networks, such as the Internet that can utilize World Wide Web (www) browsing functionality, or a combination of private networks and public networks.

A computer 100(*a*) for the system can be adapted to access data, transmit data to, and receive data from, other computers 100(*b*) . . . (*k*), via the network or network 142. The computers 100 typically utilize a network service provider, such as an Internet Service Provider (ISP) or Application Service Provider (ASP) (ISP and ASP are not shown) to access resources of the network 142.

The computers 100 may be operatively connected to a network 142, via bi-directional communication channel, or interconnector, 118, which may be for example a serial bus such as IEEE 1394, or other wire or wireless transmission media. Examples of wireless transmission media include transmission between a modem (not shown), such as a cellular modem, utilizing a wireless communication protocol, or wireless service provider or a device utilizing a wireless application protocol and a wireless transceiver (not shown). The interconnector 118 may be used to feed, or provide data.

The terms "operatively connected" and "operatively coupled", as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between one or more remote modules or devices.

The terms "client" and "server" may describe programs and running processes instead of or in addition to their application to computer systems described above. Generally, a (software) client may consume information and/or computational services provided by a (software) server.

Various embodiments of the invention are described herein with respect to scanned image databases and systems related thereto. However, it is to be understood that the invention has application to other image data where, inter alia, legibility and readability of obscured image files are desired.

While the invention has been described and illustrated with reference to certain preferred embodiments herein, other embodiments are possible. Additionally, as such, the foregoing illustrative embodiments, examples, features, advantages, and attendant advantages are not meant to be limiting of the present invention, as the invention may be practiced according to various alternative embodiments, as well as without necessarily providing, for example, one or more of the features, advantages, and attendant advantages that may be provided by the foregoing illustrative embodiments.

Systems and modules described herein may comprise software, firmware, hardware, or any combination(s) of software, firmware, or hardware suitable for the purposes described herein. Software and other modules may reside on servers, workstations, personal computers, computerized tablets, PDAs, scanners (including handheld scanners), digital cameras and camcorders, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described.

Accordingly, while the invention has been described and illustrated in connection with preferred embodiments, many variations and modifications as will be evident to those skilled in this art may be made without departing from the scope of the invention, and the invention is thus not to be limited to the precise details of methodology or construction set forth above, as such variations and modification are intended to be included within the scope of the invention. Therefore, the scope of the appended claims should not be limited to the description and illustrations of the embodiments contained herein.

What is claimed is:

1. A method for performing a process on an image, the process being implemented by a computer system comprising at least one data storage device in which is stored image data for images, at least one computer and at least one computer readable medium storing thereon computer code which when executed by the at least one computer performs the method, the method comprising the at least one computer:
   performing an analysis on an image that renders the image from a first state to a second state, wherein the second state is more legible than then the first state,
   wherein the analysis segregates dark pixels of the image from light pixels of the image;
   processing a pixel area for each pixel of the image to determine whether each of the pixels is a dark pixel or a light pixel;
   performing edge detection on the image;
   blurring the edge detection output a number of times, wherein the number of times is determined by a blur parameter;
   automatically establishing the blur parameter by performing the following:
      computing a first standard deviation of the lightness or darkness determination for a plurality of pixel values to obtain a plurality of derived pixel values;
      computing a second standard deviation of the derived pixel values from the first standard deviation; and
      progressively increasing the number of blurs until differences in the second standard deviation values between blurs plateaus.

2. The method as set forth in claim 1 comprising:
   establishing a window size parameter for the pixel areas of the image.

3. The method as set forth in claim 1 comprising:
   determining if a pixel is proximate to an edge.

4. The method as set forth in claim 2 comprising:
   identifying a home pixel for the area, the area including a plurality of pixels;
   determining if the home pixel is darker than a mean pixel within the area;

determining that the home pixel passes a filter criterion if the pixel is darker than the mean pixel within the area;
wherein the area is determined by the window size parameter.

5. The method of claim 4 wherein the method comprises manually establishing the window size parameter.

6. The method of claim 4 wherein the method comprises automatedly establishing the window size parameter.

7. The method of claim 6 wherein the method further comprises:
progressively increasing the size of the area around the home pixel and a plurality of neighboring pixels for each of the areas a number of times to establish the window size parameter.

8. The method of claim 6 wherein the method further comprises:
progressively increasing the size of the area until a lightness or darkness determination for the pixel is substantially the same as between increases.

9. The method as set forth in claim 1 comprising:
grouping the pixels into a plurality of shade values.

10. The method as set forth in claim 9 comprising:
clustering the blurred edge detection output using a clustering algorithm.

11. The method as set forth in claim 10 comprising:
clustering the blurred edge detection output using a modified K-means clustering algorithm as the clustering algorithm.

12. The method as set forth in claim 11 comprising:
grouping the pixels into the plurality of shade values including a dark duster, a medium-dark cluster, a medium-light cluster, and a light-cluster.

13. The method as set forth in claim 1 comprising:
isolating script pixels based on a filter criteria that filters pixels that are (a) proximate to the edge of the area and (b) are either locally light or locally dark.

14. The method of claim 13 wherein the method comprises manually establishing the blur parameter.

15. The method as set forth in claim 1 comprising:
first converting the image into a grayscale image.

16. A system for performing a process on an image, the process being implemented by a computer system comprising at least one data storage device in which is stored image data, at least one computer and at least one computer readable medium storing thereon computer code which when executed by the at least one computer performs a method, the method comprising the at least one computer:
performing an analysis on an image that renders the image from a first state to a second state, wherein the second state is more legible than then the first state,
wherein the analysis segregates dark pixels of the image from light pixels of the image;
identifying a home pixel for a pixel area, the pixel area including a plurality of pixels;
determining if the home pixel is darker than a mean pixel within the pixel area;
progressively increasing the size of the pixel area until a lightness or darkness determination for the home pixel is substantially the same as between increases;
performing edge detection on the image;
blurring an edge detection output a number of times, wherein the number of times is determined by a blur parameter;
wherein establishing the blur parameter comprises:
computing a first standard deviation of the lightness or darkness determination for pixel values in each of a plurality of the progressively increasing pixel areas;
computing a second standard deviation of the derived pixel values from the first standard deviation; and
progressively increasing the number of blurs until differences in the second standard deviation values between blurs plateau.

17. The system as set forth in claim 16 wherein the at least one computer performs the method, the method comprising the at least one computer:
processing a pixel area for each pixel of the image to determine whether the pixel is a dark pixel or a light pixel.

18. The system as set forth in claim 17 wherein the at least one computer performs the method, the method comprising the at least one computer:
establishing a window size parameter for the pixel areas of the image.

19. The system as set forth in claim 17 wherein the at least one computer performs the method, the method comprising the at least one computer:
determining if a pixel is proximate to an edge.

20. The system as set forth in claim 18 wherein the at least one computer performs the method, the method comprising the at least one computer:
determining that the home pixel passes a filter criterion if the pixel is darker than the mean pixel within the pixel area;
wherein the pixel area is determined by the window size parameter.

21. The system of claim 20 wherein the computer is configured to include an input for manually establishing the window size parameter.

22. The system of claim 20 wherein the at least one computer performs the method, the method comprising the at least one computer:
automatedly establishing the window size parameter.

23. The system of claim 22 wherein the at least one computer performs the method, the method comprising the at least one computer:
progressively increasing the size of the pixel area around the home pixel and a plurality of neighboring pixels for each of the pixel areas a number of times to establish the window size parameter.

24. The system as set forth in claim 16 wherein the at least one computer performs the method, the method comprising the at least one computer:
grouping the pixels into a plurality of shade values.

25. The system as set forth in claim 24 wherein the at least one computer performs the method, the method comprising the at least one computer:
clustering the blurred edge detection output using a clustering algorithm.

26. The system as set forth in claim 25 wherein the at least one computer performs the method, the method comprising the at least one computer:
clustering the blurred edge detection output using a modified K-means clustering algorithm as the clustering algorithm.

27. The system as set forth in claim 26 wherein the at least one computer performs the method, the method comprising the at least one computer:
grouping the pixels into the plurality of shade values including a dark cluster, a medium-dark cluster, a medium-light cluster, and a light-cluster.

28. The system as set forth in claim 16 wherein the at least one computer performs the method, the method comprising the at least one computer:

isolating script pixels based on a filter criteria that filters pixels that are (a) proximate to the edge of the area and (b) are either locally light or locally dark.

29. The system of claim 28 wherein the computer is configured to include and input for manually establishing the blur parameter.

30. The system of claim 28 wherein the at least one computer performs the method, the method comprising the at least one computer:

automatedly establishing the blur parameter.

31. The system as set forth in claim 16 wherein the at least one computer performs the method, the method comprising the at least one computer:

first converting the image into a grayscale image.

* * * * *